United States Patent [19]

Isaka et al.

[11] 4,343,852
[45] Aug. 10, 1982

[54] COMPOSITE FILM AND PACKAGING MATERIAL OF POLYPROPYLENE BASE AND SURFACE POLYMER COMPOSITION

[75] Inventors: Tsutomu Isaka; Kazuyoshi Ohashi; Yukinobu Miyazaki, all of Inuyama, Japan

[73] Assignee: Toyo Boseki Kabushiki Kaisha, Osaka-fu, Japan

[21] Appl. No.: 167,736

[22] Filed: Jul. 14, 1980

[30] Foreign Application Priority Data

Jul. 13, 1979 [JP] Japan .................................. 54-89579

[51] Int. Cl.³ ......................... B32B 7/02; B32B 27/08
[52] U.S. Cl. ..................................... 428/216; 428/447; 428/451; 428/497; 428/516; 428/517; 428/520; 428/522; 428/524; 428/532; 428/910; 428/413; 264/210.1; 264/290.2
[58] Field of Search ............... 428/216, 325, 516, 910, 428/520, 451, 447, 497, 517; 264/210.1, 290.2

[56] References Cited

U.S. PATENT DOCUMENTS 3,671,383 6/1972 Sakata et al. ................... 428/516 X
4,117,193 9/1978 Tsuchiya et al. ............... 428/516 X

FOREIGN PATENT DOCUMENTS 52-2068279 6/1977 Japan .................................. 428/910
54-4106585 8/1979 Japan .................................. 428/516
2030927 4/1980 United Kingdom ............... 428/910

Primary Examiner—P. Ives
Attorney, Agent, or Firm—Birch, Stewart, Kolasch and Birch

[57] ABSTRACT

A packaging material which is capable of packaging an article(s) in a closely fitted and tightly sealed state and consists essentially of a composite film stretched at least in one direction,
said composite film comprising a base film and a surface film provided on at least one surface of the base film and having certain specific shrinkage characteristics,
said base film being made of a resin composition comprising a propylene polymer, and
said surface film being made of a polymer composition comprising at least two of (A) a copolymer of propylene and ethylene in a weight proportion of 99.5:0.5 to 90:10, (B) a copolymer of propylene and an α-olefin having 4 to 10 carbon atoms in a weight proportion of 70:30 to 95:5 and (C) a copolymer of butene and any other α-olefin having 2 to 10 carbon atoms in a weight proportion of 70:30 to 99:1, each of the copolymers being in an amount of 10 to 90% by weight on the total weight of the copolymers.

33 Claims, 7 Drawing Figures

COMPOSITE FILM AND PACKAGING MATERIAL OF POLYPROPYLENE BASE AND SURFACE POLYMER COMPOSITION

The present invention relates to a packaging material and its production. More particularly, it relates to a packaging material which is capable of packaging a single article or collated articles in a closely fit and tightly sealed state and the production of said packaging material.

Advantageously, the packaging material of this invention has good transparency and gloss and is heat shrinkable. In addition, it has excellent adhesive properties at low temperature, sliding properties over a wide range of temperature and releasing properties from a hot plate, all of which are desirable for packaging articles by the use of an automatic packaging machine.

In recent years, highly advanced requirements have been made in overwrapping and outerwrapping of a variety of products such as foods, tobaccos, industrial goods and daily miscellaneous goods. In packaging of foods, for example, materials for overwrapping and outerwrapping are required to be excellent in various properties such as moisture-preventing, fragrance-keeping, insect-preventing and oxygen-barring. In addition, there are required sufficient sealing at the area of heat adhesion on packing, sufficient seal strength and sufficient air-tightness at the overwrapped portion. Additionally, a bad odor of the packaging material is undesirable from the sanitary viewpoint, so that an earnest effort has been made to decrease of remaining solvents in the packaging material. On the other hand, automatic packaging machines have been operating at higher speed with higher efficiency. For use of packaging materials in such automatic packaging machines, therefore, the following properties are necessitated: (1) heat-sealability at low temperature, (2) lubricity between the packaging material and the metal guide portion of the automatic packaging machine, (3) separability and lubricity between the packaging machine and the hot plate, (4) scratch resistance on sliding between the packaging material and the automatic packaging machine, (5) automatic suppliability of packaging material to the automatic packaging machine, etc.

As a packaging material having a heat-seal property, the following have been proposed: (a) a coating film obtained by applying a low melting point substance dissolved in an organic solvent onto a base film, (b) a single film obtained by extruding a blend of polypropylene with a low melting point polymer into a film, (c) a laminated film obtained by laminating a low melting point polymer on a base film in such a manner that the layer of the said low melting point polymer forms the heat-seal surface, (d) a single film obtained by extruding a blend of polypropylene with a low molecular weight thermoplastic resin, etc. However, the film obtained by the coating method is inferior in seal strength at high temperatures and unsuitable for seal packaging. In addition, it is difficult to completely eliminate the remaining solvent on the coating surface. The film obtained by extruding a blend of polypropylene with a low melting point polymer into a film is insufficient in seal property at low temperatures, and the transparency and gloss are apt to be decreased. Besides, the film is soft and its stiffness and resilience are small so that its automatic suppliability becomes unstable and continuous packaging by the aid of an automatic packaging machine is difficult. Various attempts have been made on a process of laminating a low melting point polymer on a base film, wherein there arise such troubles as melt adhesion of the polymer to a roll during stretching by a heat roll or scratches on the film surface in two-stage biaxial orientation. In practice, therefore, cold stretching is necessitated. Under such conditions, surface scratches may be reduced, but voids by stretching are caused so that a transparent film is unobtainable.

To overcome such drawbacks, there has been adopted a method in which a base film is stretched in the machine direction by a heat roll, said low melting point polymer is laminated on one surface or both surfaces of the base film and then the laminated film is stretched by a tenter in a manner not to be in contact with the surface which is susceptible to melt-adhesion (cf. U.S. Pat. No. 3,671,383). However, the low melting point polymer layer, which is made by monoaxial stretching, is more susceptible to damages both thermally and mechanically and is apt to lose transparency. The film incorporated with a low molecular weight thermoplastic resin can have a seal strength necessary for overlapping even under low temperature, but has a defect of loss in strength when the seal portion is kept at high temperature so that it is hardly producible into a package having excellent sealability. Since the film is kept at high temperature immediately after the heat-sealing, weakness of seal strength under such a state means the seal is nonapplicable to seal packaging.

According to the present invention, there is provided a packaging material which is capable of packaging an article(s) in a closely fit and tightly sealed state and consists essentially of a composite film stretched at least in one direction, said composite film comprising a base film and a surface film provided on at least one surface of the base film and having the following shrinkage characteristics:

$SFm \geq 3.5$
$SFt \geq 3.5$
$|St - Sm| \geq 1.5$
$SFt - St \geq 1.15$
$SFm - Sm \geq 1.15$ wherein SF is a heat shrinkage at 120° under a free state (%), S is a heat shrinkage at 120° C. under a restrained state (%), m indicates a machine direction and t indicates a transverse direction, said base film being made of a resin composition comprising a propylene polymer, and said surface film being made of a polymer composition comprising at least two of (A) a copolymer of propylene and ethylene in a weight proportion of 99.5:0.5 to 90:10, (B) a copolymer of propylene and an α-olefin having 4 to 10 carbon atoms in a weight proportion of 70:30 to 95:5 and (C) a copolymer of butene and any other α-olefin having 2 to 10 carbon atoms in a weight proportion of 70:30 to 99:1, each of the copolymers being in an amount of 10 to 90% by weight of the total weight of the copolymers.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
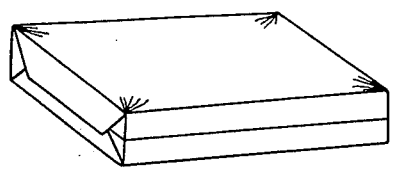
FIG. 1 shows a packaged product with wrinkles existing at the corners thereof.

The resin composition for the base film comprises a propylene polymer as the essential and major component. The propylene polymer is a polymer comprising units of propylene as the principal constituent (e.g. not less than 50% by weight) and having a melting point of 140° C. or higher, preferably 150° C. or higher. Specific examples are isotactic polypropylene having an isotactic index of 85% by weight or more, a copolymer of propylene and ethylene having an ethylene content of 7% by weight or less, a copolymer of propylene and an α-olefin having 4 to 6 carbon atoms having an α-olefin content of 10% by weight or less, etc. They may be used alone or in combination. The propylene polymer is desired to have an intrinsic viscosity of 1.6 to 3.0 dl/g (tetralin solution at 135° C.), particularly of 1.8 to 2.5 dl/g. With an intrinsic viscosity of less than 1.6 dl/g, a transparent packaging material is hardly obtainable. With an intrinsic viscosity of more than 3.0 dl/g, the extrudability is lowered, and the resulting packaging material is inferior in appearance and, when used for overwrapping, can only afford a package with insufficient gloss which decreases the commercial value.

Into the resin composition, a low molecular weight thermoplastic resin may be incorporated for enhancing favorably the advantageous physical properties. The amount of the low molecular weight thermoplastic resin is usually from 2 to 20% by weight based on the combined weight of the propylene polymer and the low molecular weight thermoplastic resin. Said low molecular weight thermoplastic resin is desired to be a resin which is compatible with the propylene polymer, has a softening point (determined according to ASTM D-36-26) of 70° to 150° C., shows a thermal stability even at a temperature of 150° C. and preferably possesses a melting viscosity of about 20,000 cp or lower at 200° C. The term "compatible" herein used is intended to mean that, when the propylene polymer is admixed with the resin, layer separation does not occur. The term "thermal stability" is intended to mean that no permanent change is caused in the properties of the resin even after heating at a desired or required temperature for 1 hour in the presence of air. The term "melting viscosity" is intended to represent the value determined by the test method of ASTM D-1824-66 using a Brookfield viscometer under heating up to a desired high temperature.

As the low molecular weight thermoplastic resin, there may be used natural and synthetic waxes, hydrocarbon resins, rosins, dammars, phenol resins, chlorinated aliphatic hydrocarbon waxes, chlorinated polynuclear aromatic hydrocarbons, etc.

The natural waxes include haze wax, bees wax, spermaceti, etc. The synthetic waxes are heat cracked products of high molecular weight polymeric substances, low molecular weight polymers of olefins such as ethylene and propylene, etc. The hydrocarbon resins are hydrocarbon polymers derived from coke oven gas, coal tar distillates, decomposed or deep-decomposed petroleum materials, substantially pure hydrocarbon materials and turpentine oil, and typical examples are cumarone-indene resins, petroleum resins, styrene resins, cyclopentadiene resins, terpene resins, etc. The cumarone-indene resins are hydrocarbon resins recovered from coke oven gas or obtained by polymerization of resin-forming substances present in coal tar distillates, phenol-modified cumarone-indene resins and their derivatives. The petroleum resins are hydrocarbon resins obtained by polymerization of deep-decomposed petroleum materials in the presence of a catalyst. These petroleum materials usually contain a mixture of resin-forming substances such as styrene, methylstyrene, vinyltoluene, indene, methylindene, butadiene, isoprene, piperylene and pentylene. The styrene resins are low molecular weight homopolymers of styrene and copolymers of styrene with other monomers such as α-methylstyrene, vinyltoluene and butadiene. The cyclopentadiene resins are cyclopentadiene homopolymers and copolymers derived from coal tar distillates and separated petroleum gas and may be produced by keeping cyclopentadiene-containing materials at high temperature for a considerably long time. Depending on the reaction temperature, dimers, trimers or higher polymers may be obtained. The terpene resins are polymers of terpenes (=hydrocarbons of the formula: $C_{10}H_{16}$ present in almost all essential oils and oil-containing resins of plants) and phenol-modified terpene resins. Specific examples of terpenes are α-pinene, β-pinene, dipentene, linonene, myrcene, bornylene, camphene and similar terpens. These resins are described in Kirk-Othmer's "Encyclopedia of Chemical Technology", Second Ed., Vol. 11, 242–255 (1966).

The rosins are natural resinous substances present in oil-containing resins of pine trees, rosin esters, modified rosins (e.g. fractionated rosins, hydrogenated rosins, dehydrogenated rosins) and other similar substances. These substances are described in Kirk-Othmer's "Encyclopedia of Chemical Technology", Second Ed., Vol. 17, 475–505 (1966).

The dammars are colorless or yellow substances present in plants such as kanari and other similar substances. These substances are described in "Encyclopedia Chimica" (Kyoritsu Shuppan), Vol. 5, 776 (1961).

The phenol resins are reaction products of phenols and aldehydes. Examples of phenols are phenol, cresol, xylenol, p-tert-butylphenol, p-phenylphenol and other similar substances. Examples of aldehydes are formaldehyde, acetaldehyde and furfuraldehyde. These resins are described in Kirk-Othmer's "Encyclopedia of Chemical Technology", Second Ed., Vol. 15, 176–207 (1966).

The chlorinated aliphatic hydrocarbon waxes are chlorinated paraffin waxes (usually called "chlorinated waxes"). Typical ones contain about 30 to 70% by weight of chlorine.

The chlorinated polynuclear aromatic hydrocarbons are chlorinated hydrocarbons containing at least two aromatic rings such as chlorinated biphenyl, terphenyl and their mixtures. Typical ones contain about 30 to 70% by weight of chlorine.

The resin composition for the base film may contain other polymers in such amounts as not deteriorating its quality. Further, it may contain any additive such as an antistatic agent, a lubricating agent or an anti-blocking agent for increasing the packaging properties.

When an antistatic agent is used, it may be incorporated into the resin composition in an amount of 0.5 to 3 parts by weight to 100 parts by weight of the combined amount of the propylene polymer and, if used, the low molecular weight thermoplastic resin. When a lubricating agent and/or an anti-blocking agent are employed, they may be incorporated into the resin composition respectively in amounts of 0.1 to 3 parts by weight to 100 parts by weight of the combined amount of the propylene polymer and, if used, the low molecular weight thermoplastic resin.

As the antistatic agent, there may be used any commercially available one which is blendable, and its typical examples include the following compounds:

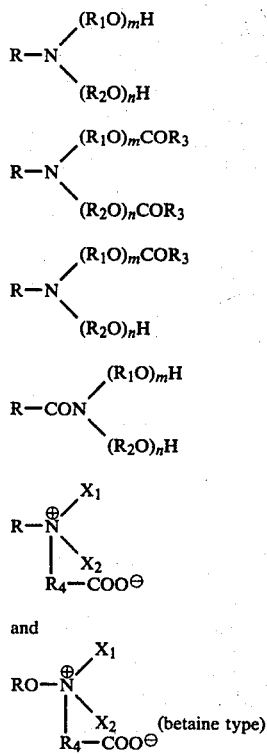

and (betaine type)

wherein R and $R_3$ are each a monovalent aliphatic group having 12 to 22 carbon atoms, $R_1$ and $R_2$ are each a divalent hydrocarbon group having 2 to 4 carbon atoms, $R_4$ is a divalent hydrocarbon group having 1 or 2 carbon atoms, $X_1$ and $X_2$ are each a saturated hydrocarbon group having not more than 22 carbon atoms, which bears optionally a hydroxyl or alkoxy or a group of the formula: $(R_5\text{-}O)_pH$ (in which $R_5$ is a divalent hydrocarbon group having 1 to 4 carbon atoms and p is an integer of not more than 20), or they may be taken together to make a ring and $m+n$ is an integer of 0 to 8. There may be also used monoglycerides of fatty acid esters, polyoxyethylene alkyl phenyl ether, etc. These antistatic agents may be used alone or in combination. Examples of the lubricating agent are higher fatty acid amides, higher fatty acid esters, waxes, metal soaps, etc. Examples of the anti-blocking agent are inorganic additives such as silica, calcium carbonate, magnesium silicate and calcium phosphate, non-ionic surfactants, anionic surfactants, incompatible organic polymers (e.g. polyamides, polyesters, polycarbonates), etc.

At the packaging material-supplying portion of an automatic packaging machine, troubles due to static electricity are frequently encountered. For instance, a packaging material may be adsorbed on or wound around the edge of the cutter. Further, for instance, a packaging material may be pulled toward the guide plate by static induced force. It has now been found that these troubles due to static electricity can be prevented to a great extent by incorporating the anti-static agent into the resin composition foor the base film. Particularly when the low molecular weight thermoplastic resin is incorporated together, such preventive effect is highly enhanced. Thus, the incorporation of the low molecular weight thermoplastic resin and the antistatic agent is effective in improvement of the packaging material suppliability to an automatic packaging machine.

The polymer composition for the surface film comprises two or three copolymers chosen from the copolymers (A), (B) and (C) respectively in amounts of 10 to 90% by weight on the total weight of the copolymers.

The copolymer (A) is a copolymer of propylene and ethylene having an ethylene content of 0.5 to 10% by weight, which is preferred to have a melt index of 0.5 to 10 g/10 min., particularly of 1.0 to 10 g/10 min. Especially, preferred is a random copolymer having an ethylene content of 2.5 to 6% by weight, and the most preferred is a random copolymer having an ethylene content of 3.6 to 6% by weight. When the ethylene content is not less than 3.6% by weight, the depression of the heat-seal property as recognized on the oxidation treatment for improvement of the adhesiveness of a printing ink or a vaporized metal is hardly produced, and this is an extreme advantage from the practicaly viewpoint. In case of the ethylene content being less than 0.5% by weight, the uniform blending with the copolymer (B) is difficult, and transparency and gloss are lowered. In an extreme instance, the produced film loses gloss and transparency. In case of the ethylene content being more than 10% by weight, the sliding property under heating is deteriorated, and wrinkles and scratches are produced on the packaged product.

The copolymer (B) is a copolymer of propylene and an α-olefin having 4 to 10 carbon atoms, having a propylene content of 70 to 95% by weight. Examples of the α-olefin are ethylene, propylene, pentene, hexene, 4-methylpentene-1, octene, decene, etc. When the propylene content is less than 70% by weight, transparency and gloss are deteriorated, and the coefficient of friction at high temperature is high so that on heat-sealing, wrinkles and scratches are produced on the packaging material due to the inferior sliding property. Thus, the production of a close fit packaging product by the use of an automatic packaging machine is difficult. In addition, sticking onto a heating stretch roll is apt to occur on the two-stage biaxial strecthing, and a packaging material having a flat surface and an excellent appearance without any harm is hardly obtainable. When the propylene content is more than 95% by weight, the heat-seal property is deteriorated, and the heat-seal with a high speed at low temperature becomes difficult. Because of this reason, the heat-seal temperature is required to be higher so that the packaging material at the heat-seal portion is damaged by heat, and a beautiful packaged product is hardly obtainable.

The copolymer (C) is a copolymer of butene and any other α-olefin having a butene content of 70 to 99% by weight. The other α-olefin may be, for instance, ethylene, propylene, pentene, hexene, 4-methylpentene-1, octene or decene. It is preferred to have a melt index of 0.5 to 15 g/10 min.

Two or three chosen from the above copolymers (A), (B) and (C) are mixed together respectively in amounts of 10 to 90% by weight on the basis of the total amount of them. Typical examples of the combination of the copolymers are as follows:

Copolymer (A): copolymer (B) = 10–90:90–10 by weight.

This combination is suitable for obtaining a packaging material having good heat-seal property at low temperature and high transparency. A particularly preferred proportion is 10–70:90–30.

Copolymer (A): copolymer (C) = 10–90:90–10 by weight.

This combination is suitable for preparation of a packaging material having good seal property and heat-seal property at low temperature. A particularly preferred proportion is 30–70:70–30. When high transparency is desired, the proportion may be 70–90:30–10.

Copolymer (B): copolymer (C) = 10–90:90–10 by weight.

This combination is suitable for preparation of a packaging material having good transparency and high heat-seal property at low temperature. A particularly preferred proportion is 50–85:50–15.

Copolymer (A): copolymer (B): copolymer (C) = 10–90:10–90:10–90 by weight.

This combination is suitable for obtaining a packaging material having excellent seal property, high transparency and good heat-seal property at low temperature. A particularly preferred proportion is 10–70:50–80:10–60.

When desired, a silicone oil may be incorporated into the polymer composition in an amount of 0.01 to 0.15 part by weight to 100 parts by weight of the total amount of the copolymers. Examples of the silicone oil are polydimethylsiloxane, polymethylphenylsiloxane, olefin-modified silicone, polyether (e.g. polyethylene glycol, polypropylene glycol)-modified silicone, olefin/polyether-modified silicone, epoxy-modified silicone, amino-modified silicone, alcohol-modified silicone, etc. Among them, olefin-modified silicone, polyether-modified silicone and olefin/polyether-modified silicone are particularly preferable.

The silicone oil improves the coefficient of friction of the packaging material at the heated state, reduces the slide resistance caused during hot plate seal by an automatic packaging machine and thus prevents generation of wrinkles, which makes it possible to obtain a packaging material having a beautiful appearance, a high sealing ability and an excellent close-fitting property to a product to be packaged. Further, decrease of the gloss due to sliding can be prevented to obtain a sealed portion with beautiful appearance. By the use of the silicone oil, the friction coefficient at high temperature in heat-sealing under sliding can be decreased to 1.4 or smaller. For obtaining a sufficient effect, the silicone oil is desired to have a viscosity of 50 to 10,000 cs, preferably of 50 to 300 cs, at room temperature.

The effect of the silicone oil can be further increased by the combined use of an ethylene oxide-addition product of castor oil having a softening point of 70° to 140° C., an oxidized synthetic wax, a higher fatty acid alkyl ester, a polyalcohol alkylate-ethylene oxide addition product, a fatty acid amide, etc. These compounds are usually used in an amount of 1 to 300 parts by weight, preferably of 50 to 300 parts by weight, to 100 parts by weight of the silicone oil. The combined use of these compounds together with the silicone oil prevents stick slip at a temperature of room temperature to 100° C. which is apt to occur by the sole use of the silicone oil and improves the lubrication between the packaging material and various metal guide plates of the automatic packaging machine to prevent bad packaging. Further, the lubricity at high temperature under elevated pressure is improved because the friction coefficient at high temperature is decreased to 1.4 or smaller, preferably 1.0 or smaller; such characteristics are extremely important for obtaining an excellent sealed package according to the invention. Although the silicone oil and the said additives can give these advantageous effects, they are apt to decrease the heat-sealing property of the packaging material and lower the transparency. Because of such tendency, it is desired in practice to effect heat-sealing at relatively high temperature.

For enhancing the gloss and transparency of the packaging material and also for imparting an antistatic property to the packaging material without deterioration of a heat-seal property at low temperature by electron discharge treatment, a low molecular weight thermoplastic resin may be incorporated into the polymer composition for the surface film in an amount of 3 to 25% by weight based on the combined weight of the copolymers and the low molecular weight thermoplastic resin. Without such incorporation, however, the packaging material of this invention is, in general, hardly deteriorated in heat-seal property at low temperature by electron discharge treatment. This is one of the advantageous characteristics of the packaging material of the invention. Particularly, the copolymer (A) having an ethylene content of not less than 3.6% by weight, the copolymer (B) having an α-olefin content of not less than 10% by weight and the copolymer (C) having an α-olefin content of not less than 1% by weight are favorable. When the amount of the low molecular weight thermoplastic resin is less than 3% by weight, the substantial enhancement of gloss and transparency is not seen. When it is more than 25% by weight, the gloss and transparency are rather deteriorated with lowering of the tacking power at high temperature, and the close fitting packaging property is made inferior.

Incorporation of a lubricating agent and/or an antiblocking agent into the polymer composition in an amount of 0.1 to 3 parts by weight to 100 parts by weight of the total amount of the copolymers and, if used, the low molecular weight thermoplastic resin is effective in improvement of the lubricity and the antiblocking property. Specific examples of these additives may be the same as hereinbefore stated in connection with their use for the base film. It is also possible to improve the antistatic property by incorporation of the antistatic agent as stated in connection with the base layer film in an amount of 0.5 to 3 parts by weight to 100 parts by weight of the total amount of the copolymers and, if used, the low molecular weight thermoplastic resin.

In general, heat-sealing with a high speed at a high temperature by the use of an automatic packaging machine tends to produce scratches at the surfaces of the films or sheets employed for packaging. It also tends to produce an uneven heat shrinkage so that a flat seal surface is hardly obtainable. For instance, in case of a biaxially stretched film of polypropylene having a high crystallinity and a high melting point, uniform shrinkage as seen in a film of polyvinyl chloride is not achieved. The polypropylene film shrinks at the portion contacted with a hot plate and affords only an uneven seal surface. When a packaging material is of the kind producing the above phenomenon, a closely fitted and tightly sealed packaged product can not be obtained. In order to obtain such product, it is necessary that heat-sealing is applicable not only at a low temperature but also at a high temperature (i.e. under a heated state) to give a high seal strength at the heat-sealed portion. For instance, the heat-seal strength at 120° C. is desirable to be not less than 40 g/cm. While a heat-seal packaged product is usually subjected to heat shrinkage by the use of a heat shrinking apparatus such as a high shrink tunnel, the depression of the heat-seal strength after the heat shrinkage results in separation or movement at the heat-sealed portion so that the seal is unfavorably loosened. For this reason, the packaging material which is heat shrinkable is desired to have a 60% or more, preferably 80% or more, retention rate of the heat-seal strength. It is also necessary that the coefficient of friction under a heated state is low. For instance, the coefficient of friction at 120° C. may be not more than 1.4.

In addition to the above characteristic properties, the packaging material of the invention is desired to have certain specific shrinkage characteristics for production of a closely fitted and tightly sealed packaging product. Such shrinkage characteristics are representable by the following equations:

$$SFm \geq 3.5\ (\%) \quad (1)$$

$$SFt \geq 3.5\ (\%) \quad (2)$$

$$|St-Sm| \geq 1.5\ (\%) \quad (3)$$

$$SFt-St \geq 1.15\ (\%) \quad (4)$$

$$SFm-Sm \geq 1.15\ (\%) \quad (5)$$

wherein SF, S, m and t are each as defined above.

Figure 2:
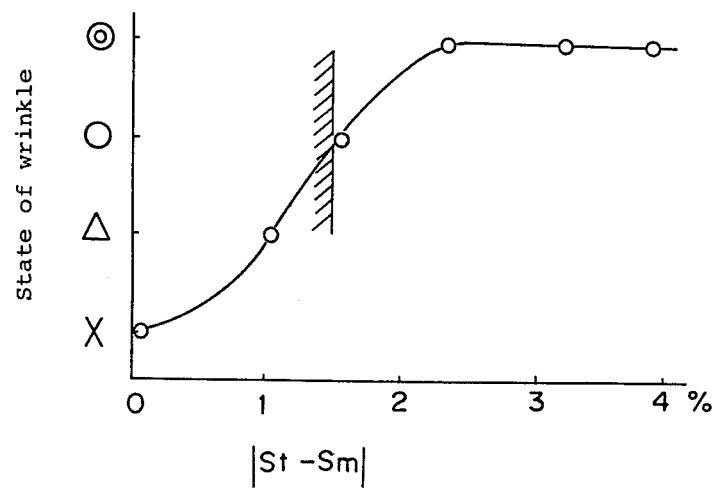
FIG. 2 shows the relationship between the wrinkle state and the difference between the heat shrinkage under a restrained state in the transverse direction (St) and machine direction (Sm)

When the equations (1) and (2) are satisfied, the gap which may be produced between the packaging material and the article to be packaged on automatic packaging can be eliminated over a wide range of heat shrinkage temperature. Still, SFm is usually not more than 30 (%), preferably not more than 15 (%). SFt is usually not more than 55 (%), preferably not more than 35 (%). When the equation (3) is satisfied, the retention of wrinkles, as shown in FIG. 1 of the accompanying drawings, at the corner of the packaged product after the heat shrinking treatment can be avoided. The relationship between the |St-Sm| and the state of wrinkles is shown in FIG. 2.

Figure 3:
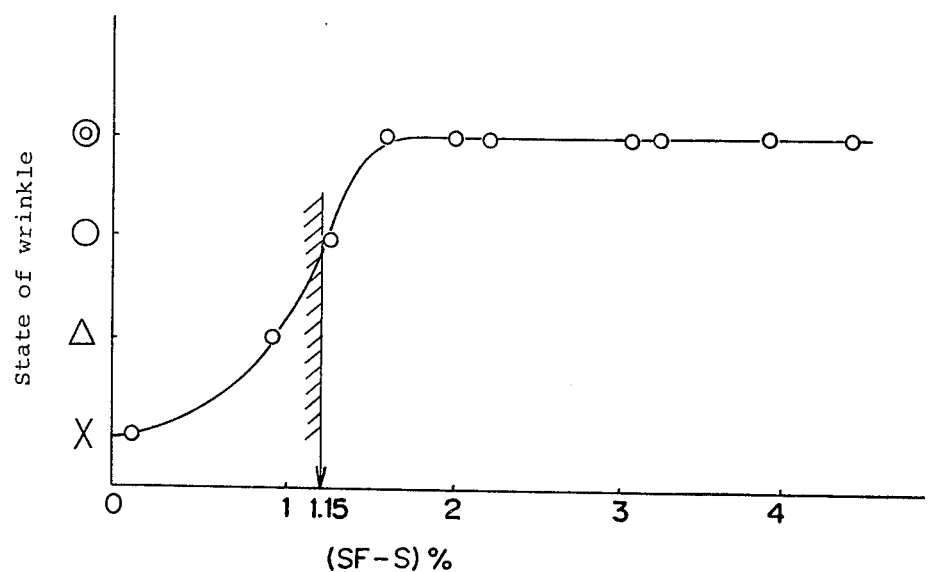
FIG. 3 shows the relationship between the wrinkle state and the difference between the heat shrinkage in the free state (SF) and the heat shrinkage under a restrained state (S)
Figure 4:
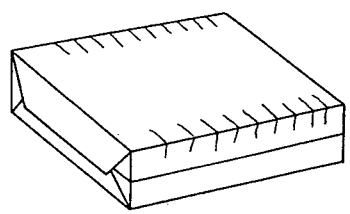
FIGS. 4 and 5 show the disadvantageous presence of folds in a packaged product when the difference between the heat shrinkage in the free state, in the transverse direction and the heat shrinkage in the restrained state, in the transverse direction is more than 1.15%; and the difference between heat shrinkage in the free state, in the machine direction and the heat shrinkage in the restrained state, in the machine direction is more than 1.15%.
Figure 5:
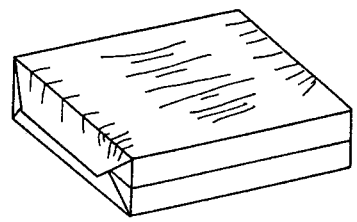

When the equations (4) and (5) are satisfied, the retention of folds on the packaged product after the heat shrinking treatment can be avoided. The relationship between (SF-S) and the state of wrinkles is shown in FIG. 3. The presence of folds, as shown in FIGS. 4 and 5 which correspond respectively to the case that (SFt-St) is more than 1.15 (%) and the case that (SFm-Sm) is more than 1.15 (%), is apparently disadvantageous, because the appearance is inferior and breakage is caused.

Heating for shrinkage may be carried out by any conventional manner such as infrared heating, electric heating, flame heating, hot air heating or hot water heating.

For preparation of the packaging material, the surface film is provided on at least one surface of the base film to make a laminated film. In other words, the surface film may be provided on only one surface of the base film to make a composite film composed of the surface film/the base film, or on both surfaces of the base film to make a composite film composed of the surface film/the base film/the surface film. The bonding between the base film and the surface film may be achieved by the use of any adhesive agent. Usually, however, the bonding is accomplished without any adhesive agent as hereinafter explained.

The packaging material may be prepared by the two-stage biaxial stretching method in which a heating roll is used on stretching in a machine direction, though the preparation can be effected more easily by the simultaneous biaxial stretching method. In case of the two-stage biaxial stretching, a strong binding power is obtained between the films to afford a packaging material with an excellent heat-seal strength. In addition, the preparation of the composite film can be effected economically.

The preferred conditions for obtaining the packaging material of the invention are as follows: In case of uniaxial stretching, the laminated film is stretched 3.5 to 10 times in a machine direction or a transverse direction. The stretching temperature is usually 100° to 160° C. in roll stretching or 140° to 165° C. in tenter stretching. In case of subjecting the laminated film to two-stage biaxial stretching, stretching may be effected 3.5 to 10 times, preferably 3.8 to 7.5 times, in a machine direction and 4 to 12 times, preferably 6 to 9 times, in a transverse direction. In case of simultaneous biaxial stretching, the temperature is usually from 140° to 165° C. In two-stage biaxial stretching, the temperature at the first step may be from 100° to 160° C., preferably from 110° to 130° C., and the temperature at the second step may be from 140° to 165° C., preferably from 145° to 160° C. The heat setting is not essential but may be effected in so far as the said heat shrinkage characteristics are not lost; the usual conditions for the heat setting are at 50° to 140° C. for 3 to 60 seconds.

The packaging material of this invention usually has a thickness of about 5 to 200 microns, particularly of about 15 to 60 microns, although it may vary with the intended use. The total thickness of the surface film(s) is normally within a range of 0.2 to 50% on the basis of the thickness of the packaging material. When packaging is effected by the use of an automatic packaging machine, the thickness of each surface film may be from 0.2 to 10 microns in addition to the above requirements. In case of using an automatic packaging machine of cigarette hold type, the thickness of each surface is preferred to be from 0.2 to 3 microns.

As an automatic packaging machine, there are at least two known types, of which one is the type of heat-sealing with sliding under heating and pressing, and the other is the type of heat-sealing under heating and pressing. In case of the former, it is preferred that the thickness of each surface film is from 0.2 to 3 microns. In case of the latter (which is the usual heat-seal system), the thickness of each surface film is preferred to be from 0.7 to 10 microns.

The packaging material of the invention is the one stretched into at least one direction. Preferably, the base film is biaxially stretched and the surface film is uniaxially or biaxially stretched.

For preventing the production of static electricity during automatic packaging, at least one surface of the composite film may be subjected to electric discharge treatment such as corona discharge treatment or glow discharge treatment. Also, a minimum effective amount of an antistatic agent may be incorporated into the polymer composition for the surface film. In general, however, electric discharge treatment results in deterioration of the heat-seal property of the composite film. Particularly when electron discharge treatment is applied to a great extent, not only the heat-seal property at low temperature but also the heat-seal property at high temperature are lost. In order to improve an antistatic property as well as a sliding property while maintaining a good heat-seal property, it is recommended to incorporate a low molecular weight thermoplastic resin into the polymer composition for the surface film and to subject the resultant composite film to electron discharge treatment. Examples of the low molecular weight thermoplastic resin suitable for the said purpose are hydrocarbon resins, rosins, dammars, phenol resins, etc.

In order to have a good antistatic property, the surface resistivity is preferred to be not more than $10^{12}$ or $10^{13}$ $\Omega$.cm, particularly from $10^8$ to $10^{10}$ $\Omega$.cm. With a smaller thickness of the composite film, a lower surface resistivity is required. Electron discharge treatment may be carried out to such an extent that a wetting tension at the surface is from 30.5 to 58 dyne/cm, particularly from 30.5 to 37 dyne/cm. This latter range is suitable for realizing good sliding property and antistatic property in a range of low temperature, for instance, from room temperature to 70° C. with a high heat-seal property at low temperature.

Practical and presently preferred embodiments of the invention are illustratively shown in the following Examples wherein part(s) and % are by weight unless otherwise indicated. In these Examples, the physical properties are determined as follows:

(1) Haze

Determined by the use of a haze tester manufactured by Toyo Seiki K.K. according to JIS (Japanese Industrial Standard) K-6714.

(2) Automatic suppliability

By the use of an automatic packaging machine W-37 (manufactured by Tokyo Automatic Machinery Co., Ltd.), packaging is effected at a rate of 100 packages/min. The state of the continuous automatic supply of the composite film is observed for 1 minute, and evaluation is made on the following criteria:
O: No material problem; smooth supply
Δ: Occasional problems occur
X: Automatic supply is impossible due to winding-up of the composite film around the cutter and electrostatic adhesion of the composite film onto the guide surface

(3) Wrinkles at the heat-sealed portion

Evaluation is made on the wrinkles at the heat-sealed portion by the use of the automatic packaging machine as stated in (2) according to the following criteria:
O: No material problem
Δ: Wrinkles notable
X: Many wrinkles, no commercial value

(4) Heat-seal strength

Heat-sealing is effected by the aid of a thermal inclination heat-sealer (manufactured by Toyo Seiki K.K.) under a pressure of 1 kg/cm$^2$ for 1.0 second, and the peeling-off strength is measured under a speed of 200 mm/min.

(5) Degree of close fitting

Evaluation is made on the appearance of the packaged products obtained by packaging sample cases by the use of the automatic packaging machine as stated in (2) and passing the packaged cases through a heat oven for shrinkage according to the following criteria:
⊙: Closely fitted, tightly sealed, no wrinkle
O: Fitted, some wrinkles
Δ: Fitted parts and non-fitted parts present, some wrinkles
X: Many wrinkles

(6) Grade of seal-packaging

By the aid of the automatic packaging machine as stated in (2), 100 packs per minute are effected at 150° C., and the air-tightness of the sealed portion is judged from the amount of leaking water. Into an externally packaged product in a box form, water containing 0.2% of a surface active agent (50 ml) is poured, and the amount of water leaking in 1 minute is measured. Evaluation is effected affording to the following criteria:

| Class | Amount of leaking water (ml/min) |
| --- | --- |
| A | 0–10 |
| B | 11–20 |
| C | 21–30 |
| D | 31–50 |
| E | larger than 50 |

(7) Free heat shrinkage (SF)

The test film is cut to make a test piece of 15 mm wide and 300 mm long, which is marked at the two points having a distance of 200 mm. Under a free state, the test piece is shrinked at 120° C. The distance between the two points is measured before shrinkage (L) and after shrinkage (L') and SF is calculated according to the following equation:

$$SF = \frac{L - L'}{L} \times 100 \, (\%)$$

(8) Heat shrinkage under a restrained state (S)

On a pair of sides in parallel of a rectangular flame of 110 mm long and 70 mm wide, a test film is fixed. The test film which is not fixed at the other pair of sides in parallel is shrinked at 120° C. The length is measured before shrinkage (L) and after shrinkage (L'), and S is calculated according to the following equation:

$$S = \frac{L - L'}{L} \times 100 \, (\%)$$

EXAMPLE 1

To 100 parts of a mixture of isotactic polypropylene (intrinsic viscosity (at 135° C. in tetralin), 2.0 dl/g) and a petroleum resin ("Arcon P-115" manufactured by Arakawa Rinsan K.K.) in a weight proportion of 90:10, 1.0 part of an alkylamine-ethylene oxide adduct and 0.5 part of glycerol stearate were added to obtain a resin composition for the base film.

Separately, 100 parts of a mixture of propylene/ethylene copolymer (ethylene content, 4.5%; melt index, 2.5 g/10 min) and propylene/butene-1 copolymer (propylene content, 80%) in a weight proportion of 50:50 were admixed with 0.4 part of a glycerol fatty acid ester, 0.5 part of hydroxystearoamide ("Diamide KH" manufactured by Nihon Kasei K.K.) and 0.1 part of polyethylene wax (molecular weight, 2,000) to obtain a polymer composition for the surface film.

The above compositions were respectively melt extruded by separate extruders to obtain a casted composite film composed of the three layers, i.e. the surface film/the base film/the surface film, and having a thickness of 1,000 microns.

The casted composite film was stretched at 130° C. 5.0 times in a machine direction and at 160° C. 8.0 times in a transverse direction, passed through an oven at 100° C. with a relaxation of 4% in 8 seconds and cooled by applying air of 20° C. thereto to obtain a biaxially stretched composite film having a thickness of 25 microns. The stretched composite film was subjected to corona discharge treatment to make a surface wetting wetting tension of 40 dyne/cm, and printing was effected on the surface, whereby a packaging material was obtained.

A carton containing a pharmaceutical product was packaged with the packaging material by the use of an overwrapping machine. Hot air was applied to the packaged product from the upper and lower sides for a designed period of time to shrink the packaging material, whereby a closely fitted and tightly sealed packaged product was obtained.

Comparative Example 1

In the same manner as in Example 1 but heat setting by passing through an oven at 155° C. with a relaxation of 5%, there was prepared a packaging material.

Using the packaging material, packaging with heat shrinking was effected as in Example 1.

Comparative Example 2

In the same manner as in Comparative Example 1 but using propylene/ethylene copolymer (ethylene content, 3.4%, melt index, 2.5 g/10 min) alone as the copolymer component in the polymer composition for the surface film, there was prepared a packaging material.

Using the packaging material, packaging with heat shrinking was effected as in Example 1.

Comparative Example 3

To 100 parts of a mixture of isotactic polypropylene (intrinsic viscosity, 2.0 dl/g) and polybutene-1 in a weight proportion of 60:40, 1.0 part of an alkylamine-ethylene oxide adduct and 0.5 part of glycerol stearate were added to obtain a resin composition.

The resin composition was melt extruded to obtain a casted film having a thickness of 1,000 microns.

The casted film was stretched at 110° C. 5.0 times in a machine direction and then at 145° C. 8.0 times in a transverse direction. The biaxially stretched film was subjected to heat setting under the same conditions as in Comparative Example 1 to give a packaging material having a thickness of 25 microns.

Using the packaging material, packaging with heat shrinking was effected as in Example 1.

The physical properties of the packaging materials and the packaging states of the packaged products in Example 1 and Comparative Examples 1 to 3 are shown in Table 1.

TABLE 1

| Properties | Example 1 | Comparative 1 | Comparative 2 | Comparative 3 |
|---|---|---|---|---|
| Haze (%) | 2.6 | 3.2 | 3.1 | 15.1 |
| Automatic suppliability | O | O | X | O |
| Wrinkles at heat-sealed portion | O | O | O | Δ |
| Gloss (%) | 114 | 110 | 103 | 48 |
| Heat-seal strength at 135° C. (kg/cm².sec) | 133 | 140 | 25 | 59 |
| Degree of close-fitting (Temp. (°C.) × Time (min)) | | | | |
| 100 × 1 | O | X - Δ | X | Δ |
| 120 × 1 | O | Δ | X | Δ |
| 130 × 0.5 | O | X - Δ | X | X - Δ |
| SFm/SFt | 6.2/11.3 | 2.8/1.5 | 2.9/2.3 | 4.5/6.0 |
| Sm/St | 3.6/6.8 | 1.8/0.8 | 1.9/1.7 | 2.5/4.9 |
| \|St - Sm\| | 3.0 | 1.0 | 0.2 | 2.4 |
| SFt - St/SFm - Sm | 2.1/4.1 | 1.0/0.7 | 1.2/0.6 | 2.0/1.1 |

EXAMPLE 2

To 100 parts of isotactic polypropylene (intrinsic viscosity, 2.0 dl/g), 1.0 part of an alkylamine-ethylene oxide adduct and 0.5 part of glycerol stearate were added to obtain a resin composition for the base film.

Separately, 100 parts of a mixture of butene-1/ethylene copolymer (ethylene content, 4.5%; melt index, 2.5 g/10 min) and propylene/butene/-1 copolymer (propylene content, 80%) in a weight proportion of 50:50 were admixed with 0.4 part of a glycerol fatty acid ester, 0.5 part of hydroxystearoamide ("Diamide KH" manufactured by Nihon Kasei K.K.) and 0.1 part of polyethylene wax (molecular weight, 2,000) to obtain a polymer composition for the surface film.

The above compositions were respectively melt extruded by separate extruders to obtain a casted composite film composed of the three layers, i.e. the surface film/the base film/the surface film, and having a thickness of 1,000 microns.

The casted composite film was stretched at 130° C. 5.0 times in a machine direction and at 160° C. 8.0 times in a transverse direction, passed through an oven at 100° C. with a relaxation of 4% in 8 seconds and cooled by applying air of 20° C. thereto to obtain a biaxially stretched composite film having a thickness of 25 microns. The stretched composite film was subjected to corona discharge treatment to make a surface wetting tension of 40 dyne/cm, and printing, optionally followed by metallization, was effected on the surface, whereby a packaging material was obtained.

A carton containing a pharmaceutical product was packaged with the packaging material by the use of the overwrapping machine. Hot air was applied to the packaged product from the upper and lower sides for a designed period of time to shrink the packaging material, whereby a closely fitted and tightly sealed packaged product was obtained.

Comparative Example 4

In the same manner as in Example 2, but heat setting by passing through an oven at 155° C. with a relaxation of 5%, there was prepared a packaging material.

Using the packaging material, packaging with heat shrinkage was effected as in Example 2.

Comparative Example 5

In the same manner as in Comparative Example 4 but using propylene/ethylene copolymer (ethylene content, 3.4%; melt index, 2.5 g/10 min) alone as the copolymer component in the polymer composition for the surface film, there was prepared a packaging material.

Using the packaging material, packaging with heat shrinkage was effected as in Example 2.

Comparative Example 6

To 100 parts of a mixture of isotactic polypropylene (intrinsic viscosity, 2.0 dl/g) and polybutene-1 in a weight proportion of 60:40, 1.0 part of an alkylamine-ethylene oxide adduct and 0.5 part of glycerol stearate were added to obtain a resin composition.

The resin composition was melt extruded to obtain a casted film having a thickness of 1,000 microns.

The casted film was stretched at 110° C. 5.0 times in a machine direction and then at 145° C. 8.0 times in a transverse direction. The biaxially stretched film was subjected to heat setting under the same conditions as in Comparative Example 4 to give a packaging material having a thickness of 25 microns.

Using the packaging material, packaging with heat shrinking was effected as in Example 2.

The physical properties of the packaging materials and the packaging states of the packaged products in Example 2 and Comparative Examples 4 to 6 are shown in Table 2.

EXAMPLE 3

To 100 parts of a mixture of isotactic polypropylene (intrinsic viscosity, 2.0 dl/g) and a petroleum resin ("Arcon P-115" manufactured by Arakawa Rinsan K.K.) in a weight proportion of 90:10, 0.6 part of an alkylamineethylene oxide adduct, 0.2 part of a fatty acid monoglyceride and 0.1 part of erucamide were added to obtain a resin composition for the base film. The resin composition was melt extruded at 270° C., and one surface of the extruded product was cooled with a chill roll of 250° C. while water cooling. The extruded product was stretched at 130° C. 5.0 times in a machine direction to give a uniaxially drawn film.

Separately, 100 parts of a mixture of butene-1/hexene copolymer (butene-1 content, 97%) and propylene/butene-1 copolymer (propylene content, 75%) in a weight proportion of 20:80 were admixed with 0.3 part of hydroxystearoamide ("Diamide KH" manufactured by Nihon Kasei K.K.), 0.6 part of calcium carbonate and 2 part of polyethylene wax (molecular weight, 2,000) to obtain a polymer composition for the surface film.

The polymer composition was melted at 265° C. and extruded onto the both surfaces of the uniaxially drawn film as the base film, and the resulting laminated product was stretched at 155° C. 8.5 times in a transverse direction to make a stretched composite film.

The stretched composite film was passed through an oven at 105° C. in 5 seconds and subjected to corona discharge treatment on both surfaces to make a surface wetting tension of 34 dyne/cm on one surface and a surface wetting tension of 42 dyne/cm on the other surface, and printing was effected on the surface having a surface wetting tension of 42 dyne/cm, followed by metallization with aluminum to make a metallic film of 40 mµ in thickness. On the metallization, care was taken not to metallize the heat-seal portion.

Using the thus obtained packaging material, a carton containing chocolates was packaged, followed by treatment with hot air for 2.5 seconds to shrink the packaging material. The packaged product was immediately cooled in a cooling chamber.

The resulting packaged product showed close fitting and tight sealing of the packaging material and had the following physical properties:

TABLE 2

| | Example | | | | |
|---|---|---|---|---|---|
| Properties | 2-1 | 2-2 | Comparative 4 | Comparative 5 | Comparative 6 |
| Haze (%) | 2.5 | 2.5 | 3.2 | 3.1 | 15.1 |
| Automatic suppliability | O | ⊚ | O | X | O |
| Wrinkles at heat-sealed portion | O | O | O | O | Δ |
| Gloss (%) | 115 | 143 | 110 | 103 | 48 |
| Heat-seal strength at 135° C. (kg/cm².sec) | 135 | 135 | 140 | 25 | 59 |
| Degree of close fitting Temp. (°C.) × Time (min)) | | | | | |
| 100 × 1 | O | O | X - Δ | X | Δ |
| 120 × 1 | ⊚ | ⊚ | Δ | X | Δ |
| 130 × 0.5 | O | O | X - Δ | X | X - Δ |
| SFm/SFt | 6.0/11.0 | 5.8/10.3 | 2.8/1.5 | 2.9/2.3 | 4.5/6.0 |
| Sm/St | 3.7/6.8 | 3.5/6.5 | 1.8/0.8 | 1.9/1.7 | 2.5/4.9 |
| \|St - Sm\| | 3.0 | 3.0 | 1.0 | 0.2 | 2.4 |
| SFt - St/SFm - Sm | 2.0/4.0 | 2.3/3.8 | 1.0/0.7 | 1.2/0.6 | 2.0/1.1 |

Note:
Example 2-1, Comparative Examples 4 to 6: packaging material not metallized.
Example 2-2: packaging material metallized.

| | |
|---|---|
| Haze (%) | 2.7 |
| Automatic suppliability | O |
| Wrinkles at heat-sealed portion | O |
| Gloss (%) | 110 |
| Heat-seal strength at 135° C. (kg/cm².sec) | 120 |
| Degree of close fitting at 185° C. for 2.5 seconds | |
| SFm/SFt | 5.0/9.2 |
| Sm/St | 3.1/5.3 |
| \|St - Sm\| | 2.2 |
| SFt - St/SFm - Sm | 1.9/3.9 |

EXAMPLE 4

To 100 parts of a mixture of isotactic polypropylene (intrinsic viscosity, 2.0 dl/g) and a petroleum resin ("Arcon P-115" manufactured by Arakawa Rinsan K.K.) in a weight proportion of 90:10, 1.0 part of an alkylamineethylene oxide adduct and 0.5 part of glycerol stearate were added to obtain a resin composition for the base film.

Separately, 100 parts of a mixture of butene-1/ethylene copolymer (ethylene content, 4.5%; melt index, 2.5 g/10 min) and butene-1/ethylene copolymer (butene-1 content, 95%) in a weight proportion of 50:50 were admixed with 0.4 part of a glycerol fatty acid ester, 0.5 part of hydroxystearoamide ("Diamide KH" manufactured by Nihon Kasei K.K.) and 0.1 part of polyethylene wax (molecular weight, 2,000) to obtain a polymer composition for the surface film.

The above compositions were respectively melt extruded by separate extruders to obtain a casted composite film composed of the three layers, i.e. the surface film/the base film/the surface film, and having a thickness of 1,000 microns.

The casted composite film was stretched at 130° C. 5.0 times in a machine direction and at 155° C. 8.0 times in a transverse direction, passed through an oven at 100° C. with a relaxation of 4% in 8 seconds and cooled by applying air of 20° C. thereto to obtain a biaxially stretched composite film having a thickness of 25 microns. The stretched composite film was subjected to corona discharge treatment to make a surface wetting tension of 40 dyne/cm, and printing was effected on the surface, whereby a packaging material was obtained.

A carton containing a pharmaceutical product was packaged with the packaging material by the use of an overwrapping machine. Hot air was applied to the packaged product from the upper and lower sides for a designed period of time to shrink the packaging material, whereby a closely fitted and tightly sealed packaged product was obtained.

Comparative Example 7

In the same manner as in Example 4 but heat setting by passing through an oven at 155° C. with a relaxation of 5%, there was prepared a packaging material.

Using the packaging material, packaging with heat shrinking was effected as in Example 4.

Comparative Example 8

In the same manner as in Comparative Example 7 but using propylene/ethylene copolymer (ethylene content, 3.4%; melt index, 2.5 g/10 min) alone as the copolymer component in the polymer composition for the surface film, there was prepared a packaging material.

Using the packaging material, packaging with heat shrinking was effected as in Example 4.

Comparative Example 9

To 100 parts of a mixture of isotactic polypropylene (intrinsic viscosity, 2.0 dl/g) and polybutene-1 in a weight proportion of 60:40, 1.0 part of an alkylamine-ethylene oxide adduct and 0.5 part of glycerol stearate were added to obtain a resin composition.

The resin composition was melt extruded to obtain a casted film having a thickness of 1,000 microns.

The casted film was stretched at 110° C. 5.0 times in a machine direction and then at 145° C. 8.0 times in a transverse direction. The biaxially stretched film was subjected to heat setting under the same conditions as in Comparative Example 7 to give a packaging material having a thickness of 25 microns.

Using the packaging material, packaging with heat shrinking was effected as in Example 4.

The physical properties of the packaging materials and the packaging states of the packaged products in Example 4 and Comparative Examples 7 to 9 are shown in Table 3.

TABLE 3

| | Example | | | |
|---|---|---|---|---|
| Properties | 4 | Comparative 7 | Comparative 8 | Comparative 9 |
| Haze (%) | 2.9 | 3.2 | 3.1 | 15.1 |
| Automatic suppliability | O | O | X | O |
| Wrinkles at heat-sealed portion | O | O | O | Δ |
| Heat-seal strength at 135° C. (kg/cm².sec) | 132 | 140 | 25 | 59 |
| Degree of close fitting (Temp. (°C.) × Time (min)) | | | | |
| 100 × 1 | O | X - Δ | X | Δ |
| 120 × 1 | ⊙ | Δ | X | Δ |
| 130 × 0.5 | O | X - Δ | X | X - Δ |
| SFm/SFt | 5.5/10.5 | 2.8/1.5 | 2.9/2.3 | 4.5/6.0 |
| Sm/St | 3.5/6.5 | 1.8/0.8 | 1.9/1.7 | 2.5/4.9 |
| \|St - Sm\| | 3.0 | 1.0 | 0.2 | 2.4 |
| SFt - St/SFm - Sm | 2.0/4.0 | 1.0/0.7 | 1.2/0.6 | 2.0/1.1 |

EXAMPLE 5

The printed packaging material as prepared in Example 4 was subjected to metallization in vacuum. Printing and metallization were, however, not made at the heat-seal portion.

A carton containing a pharmaceutical product was packaged with the above packaging material by the use of an overwrapping machine. In comparison with Example 4, the automatic suppliability was more improved. After overwrapping, the packaged product was passed through a tunnel wherein hot air of 185° C. was applied thereto at a speed of 15 m/sec for about 2 seconds. The packaging material was shrinked, and a closely fitted and tightly sealed packaged product having the following physical properties was obtained:

| | |
|---|---|
| Automatic suppliability | O |
| Wrinkles at heat-sealed portion | O |
| Heat-seal strength (kg/cm².sec) | 145 |

-continued

| Degree of close fitting | |
|---|---|
| 100° C. × 1 min | O |
| 120° C. × 1 min | ⊙ |
| 130° C. × 0.5 min | O |
| SFm/SFt (at 120° C.) | 5/9.8 |
| Sm/St (at 120° C.) | 3/6.1 |
| \|St - Sm\| | 3.1 |
| SFt - St/SFm - Sm | 20/3.7 |

EXAMPLE 6

In the same manner as in Example 1 but varying the amount of the petroleum resin (i.e. the petroleum resin content (%) based on the combined weight of the propylene and the petroleum resin) to be incorporated in the resin composition for the base film, there was prepared a packaging material, with which a carton containing a pharmaceutical product was packaged.

Examinations were made on automatic suppliability, grade of seal-packaging, degree of close fitting and degree of bad packaging, and the results are shown in Table 4.

TABLE 4

| Properties | Petroleum resin (%) | | | | | |
|---|---|---|---|---|---|---|
| | 0 | 2 | 10 | 20 | 30 | 50 |
| Automatic suppliability | O - Δ | O | O | O | Δ | X |
| Grade of seal-packaging (at 150° C.) | A | A | A | A | C | C |
| Degree of close fitting (at 150° C.) | O | ⊙ | ⊙ | ⊙ | O | O |

When the petroleum resin content is 0%, the automatic suppliability is decreased, because the antistatic property is somewhat reduced, and the composite film as the packaging material is adsorbs onto the guide plate or winds around the automatic cutter. When the petroleum resin content is high, heat generation is caused at the automatic cutter as the result of successive cutting operation for a long period of time, and the resin softened by heat accumulates on the cutting edge to cause insufficient cutting or pollution of the cut portion. As to the grade of seal-packaging, thermal contraction of the composite film is apt to occur when the petroleum resin content is high, and the extent of cooling of the sealed portion is varied in each part so that the composite film is not solidified in a flat form. Therefore, the heat-sealed portion becomes uneven, and the sealing degree is reduced because of the presence of gaps due to the unevenness.

The degree of close fitting indicates whether the product to be packaged is tightly packaged. By incorporating 2 to 20% of the petroleum resin, an adequate power of thermal contraction is produced at the heat-sealed portion to obtain a beautiful heat-sealed surface. In the heat-sealed surface and its environs, a temperature gradient is formed under heating and becomes more notable in a more remote part from the seal surface so that an adequate momentary contraction gives a good tension. When the petroleum resin content becomes larger, wave-like slackening of the composite film is caused from the sealed portion, and tight packaging is not attained.

Bad packaging is sometimes caused by insufficient guiding of the composite film due to static electricity. This is observed particularly when the petroleum resin is not added. When the petroleum resin content is high, the bendability is improved, but insufficient lubricity, probably due to some bleeding-out by stretching and heat setting, and deformation produce bad appearance and cause unevenness of the sealed portion so that commercial value is reduced.

EXAMPLE 7

Figure 6:
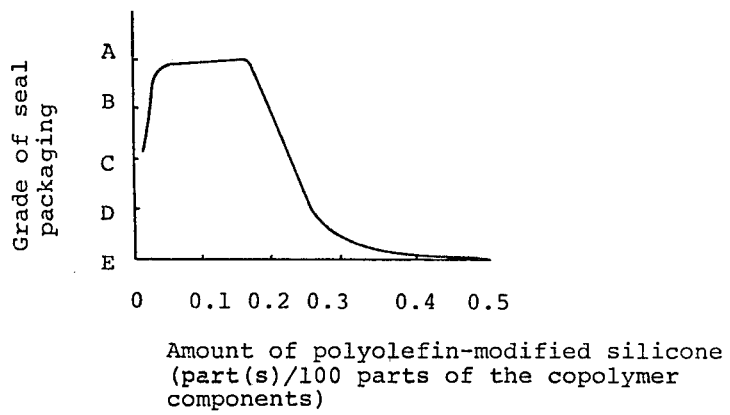
FIG. 6 shows the relationship between the amount of the polyolefin modified silicone and the grade of seal packaging.
Figure 7:
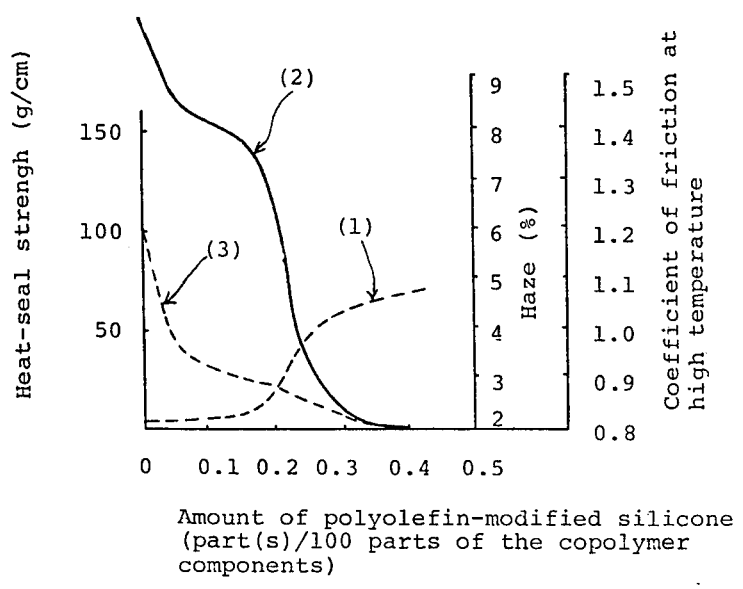
FIG. 7 shows the relationships of the amount of the polyolefin modified silicone on the haze (Curve 1), the heat-seal strength (Curve 2) and the coefficient of friction at high temperature (Curve 3).

In the same manner as in Example 1 but using propylene/ethylene copolymer (ethylene content, 4.0%; melt index, 2.5 g/10 min) and propylene/butene-1 copolymer (butene-1 content, 20%) in a weight proportion of 50:50 as the copolymer components in the polymer composition for the surface film and incorporating polyolefin-modified silicone into such polymer composition, there was prepared a packaging material. The relationship between the amount of the polyolefin-modified silicone and the grade of seal-packaging was observed, and the results are as shown in FIG. 6. The relationships of the amount of the polyolefin-modified silicone on the haze (Curve 1), the heat-seal strength (Curve 2) and the coefficient of friction at high temperature (Curve 3) were also observed, and the results are shown in FIG. 7.

EXAMPLE 8

To 100 parts of a mixture of isotactic polypropylene (intrinsic viscosity, 2.5 dl/g) and a petroleum resin ("Arcon P-115" manufactured by Arakawa Rinsan K. K.) in a weight proportion of 95:5, 1.0 part of an alkylamineethylene oxide adduct and 0.5 part of glycerol stearate were added to obtain a resin composition for the base film.

Separately, 100 parts of a mixture of propylene/ethylene copolymer (ethylene content, 5.0%; melt index, 4.0 g/10 min), propylene/butene-1 copolymer (propylene content, 80%) and butene-1/ethylene copolymer (butene-1 content, 98%) in a weight proportion of 20:50:30 were admixed with 0.4 part of a glycerol fatty acid ester, 0.5 part of hydroxystearoamide ("Diamide KH" manufactured by Nihon Kasei K. K.) and 0.1 part of polyethylene wax (molecular weight, 2,000) to obtain a polymer composition for the surface film.

The above compositions were respectively melt extruded by separate extruders to obtain a casted composite film composed of the three layers, i.e. the surface film/the base film/the surface film, and having a thickness of 1,000 microns. The casted composite film was stretched at 130° C. 5.0 times in a machine direction and at 160° C. 8.0 times in a transverse direction, passed through an oven at 100° C. with a relaxation of 4% in 8 seconds and cooled by applying air of 20° C. thereto to obtain a biaxially stretched composite film having a thickness of 25 microns. The stretched composite film was subjected to corona discharge treatment to make a surface wetting tension of 34 dyne/cm, and printing was effected on the surface, whereby a packaging material was obtained.

A carton containing a pharmaceutical product was packaged with the packaging material by the use of an overwrapping machine. Hot air was applied to the packaged product from the upper and lower sides for a designed period of time to shrink the packaging material, whereby a closely fitted and tightly sealed packaged product was obtained.

The physical properties of the packaging material and the packaging state of the packaged product are as follows:

| | |
|---|---|
| Haze (%) | 2.1 |
| Automatic suppliability | 0 |
| Wrinkles at heat-sealed portion | 0 |
| Gloss (%) | 127 |
| Heat-seal strength at 135° C. (kg/cm².sec) | 190 |
| Degree of close fitting | |
| 100° C. × 1 min | 0 |
| 120° C. × 1 min | |
| 130° C. × 0.5 min | 0 |
| Sfm/SFt | 5.2/8.5 |
| Sm/St | 3.1/5.8 |
| \|St - Sm\| | 2.7 |
| SFt - St/SFm - Sm | 2.7/2.1 |

What is claimed is:

1. A composite film comprising a base film and a surface film provided on at least one surface of the base film, said composite film having the following shrinkage characteristics:

$SFm \geq 3.5$ $SFt \geq 3.5$ $|St-Sm| \geq 1.5$ $SFt-St \geq 1.15$ $SFm-Sm \geq 1.15$ wherein SF is a heat shrinkage at 120° C. under a free state (%), S is a heat shrinkage at 120° C. under a restrained state (%), m indicates a machine direction and t indicates a transverse direction, said base film being made of a resin composition comprising a propylene polymer, and said surface film being made of a polymer composition comprising at least two of (A) a copolymer of propylene and ethylene in a weight proportion of 99.5:0.5 to 90:10, (B) a copolymer of propylene and an α-olefin having 4 to 10 carbon atoms in a weight proportion of 70:30 to 95:5 and (C) a copolymer of butene and any other α-olefin having 2 to 10 carbon atoms in a weight proportion of 70:30 to 99:1, each of the copolymers being in an amount of 10 to 90% by weight on the total weight of the copolymers.

2. The composite film according to claim 1, wherein the surface film is provided on one surface of the base film.

3. The composite film according to claim 1, wherein the surface film is provided on each of both surfaces of the base film.

4. The composite film according to claim 1, wherein the base film and the surface film are stretched at least in one direction.

5. The composite film according to claim 1, wherein the base film and the surface film are stretched biaxially.

6. The composite film according to claim 1, wherein the base film is stretched biaxially and the surface film is stretched uniaxially or biaxially.

7. The composite film according to claim 1, which has a thickness of 5 to 200 microns.

8. The composite film according to claim 1, wherein at least one surface film has a thickness of 0.2 to 10 microns.

9. The composite film according to claim 8, wherein at least one surface film has a thickness of 0.2 to 3 microns.

10. The composite film according to claim 8, wherein at least one surface film has a thickness of 0.7 to 10 microns.

11. The composite film according to claim 1, wherein the resin composition for the base film comprises further a low molecular weight thermoplastic resin in an amount of 2 to 20 parts to 100 parts by weight of the combined weight of the propylene polymer and the low molecular weight thermoplastic resin.

12. The composite film according to claim 1, wherein the resin composition for the base film comprises further at least one of antistatic agents, lubricating agents and anti-blocking agents.

13. The composite film according to claim 1, wherein the copolymer (B) in the polymer composition for the surface film is a copolymer of propylene and butene.

14. The composite film according to claim 1, wherein the copolymer (C) in the polymer composition for the surface film is a copolymer of butene and ethylene.

15. The composite film according to claim 1, wherein the copolymer (C) in the polymer composition for the surface film is a copolymer of butene and propylene.

16. The composite film according to claim 1, wherein the polymer composition for the surface film comprises the copolymers (A) and (B).

17. The composite film according to claim 1, wherein the polymer composition for the surface film comprises the copolymers (A) and (C).

18. The composite film according to claim 1, wherein the polymer composition for the surface film comprises the copolymers (B) and (C).

19. The composite film according to claim 1, wherein the polymer composition for the surface film comprises the copolymers (A), (B) and (C).

20. The composite film according to claim 1, wherein the polymer composition for the surface film comprises further a silicone oil in an amount of 0.01 to 0.15 part by weight to 100 parts by weight of the total weight of the copolymers.

21. The composite film according to claim 1, wherein the polymer composition for the surface film comprises further a low molecular weight thermoplastic resin in an amount of 3 to 25 parts by weight to 100 parts by weight of the total weight of the copolymers and the low molecular weight thermoplastic resin.

22. The composite film according to claim 1, wherein the polymer composition for the surface film comprises further at least one of antistatic agents, lubricating agents and anti-blocking agents.

23. The composite film according to claim 1, wherein the resin composition for the base film comprises a propylene polymer and a low molecular weight thermoplastic resin in a weight proportion of 80:20 to 98:2 and the polymer composition for the surface film comprises the copolymers and a low molecular weight thermoplastic resin in a weight proportion of 75:25 to 97:3.

24. The composite film according to claim 1, of which at least one surface is subjected to electric discharge treatment to have a surface wetting tension of 30.5 to 58 dyne/cm.

25. A packaging material which is capable of packaging an article or a plurality of articles in a closely fitted and tightly sealed state and consists essentially of a composite film stretched at least in one direction, said composite film comprising a base film and a surface film provided on at least one surface of the base film and having the following shrinkage characteristics:

$SFm \geq 3.5$
$SFt \geq 3.5$
$St-Sm \geq 1.5$
$SFt-St \geq 1.15$
$SFm-Sm \geq 1.15$ wherein SF is a heat shrinkage at 120° C. under a free state (%), S is a heat shrinkage at 120° C. under a restrained state (%), m indicates a machine direction and t indicates a transverse direction, said base film being made of a resin composition comprising a propylene polymer, and said surface film being made of a polymer composition comprising at least two of (A) a copolymer of propylene and ethylene in a weight proportion of 99.5:0.5 to 90:10, (B) a copolymer of propylene and an α-olefin having 4 to 10 carbon atoms in a weight proportion of 70:30 to 95:5 and (C) a copolymer of butene and any other α-olefin having 2 to 10 carbon atoms in a weight proportion of 70:30 to 99:1, each of the copolymers being in an amount of 10 to 90% by weight on the total weight of the copolymers.

26. The packaging material according to claim 25, wherein the composite film consists essentially of a base film and a surface film provided on one surface of the base film.

27. The packaging material according to claim 25, wherein the composite film consists essentially of a base film and two surface films, each of which is provided on each of both surfaces of the base film.

28. The packaging material according to claim 25, wherein the base film is stretched biaxially and the surface film is the one stretched uniaxially or biaxially.

29. The packaging material according to claim 25, wherein the composite film is obtained by stretching biaxially a laminated product comprising a base film in an undrawn state and a surface film in an undrawn state provided on at least one surface of the base film.

30. The packaging material according to claim 29, wherein the biaxial stretching is effected first in a machine direction and then in a transverse direction.

31. The packaging material according to claim 29, wherein the biaxial stretching is effected simultaneously in a machine direction and a transverse direction.

32. The packaging material according to claim 25, wherein the composite film is obtained by extruding a surface film onto at least one surface of a base film uniaxially stretched and stretching the resulting laminated product in a direction substantially perpendicular to the direction into which the uniaxial stretching of the base film has been made.

33. The packaging material according to claim 25, of which at least one surface is subjected to electric discharge treatment to have a surface wetting tension of 30.5 to 58 dyne/cm.

* * * * *